Aug. 20, 1929.  A. E. MOORHEAD  1,725,204
SPEED INDICATING AND RECORDING APPARATUS
Filed May 14, 1923  4 Sheets-Sheet 1
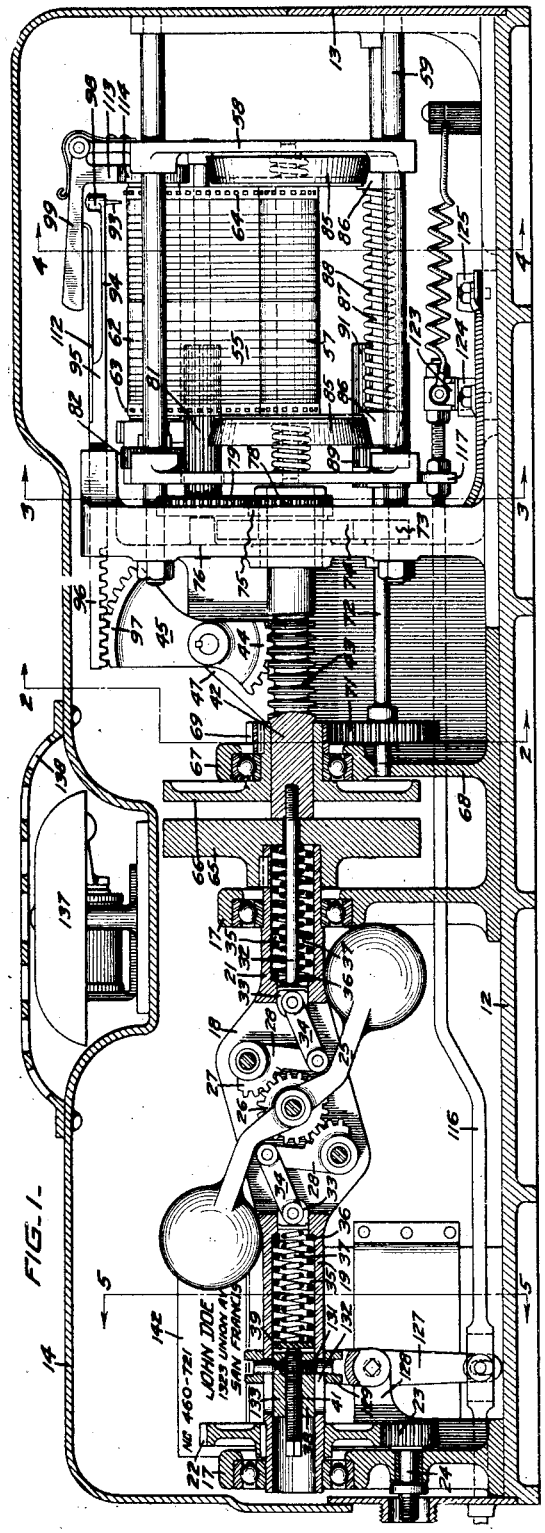
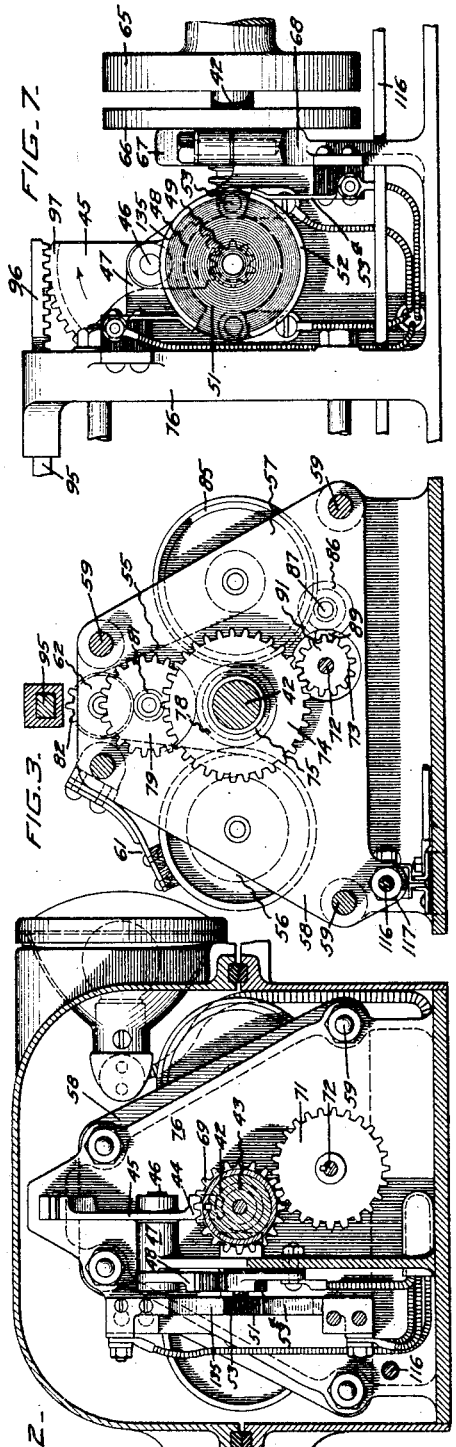
INVENTOR
ALBERT E. MOORHEAD Aug. 20, 1929.   A. E. MOORHEAD   1,725,204
SPEED INDICATING AND RECORDING APPARATUS
Filed May 14, 1923    4 Sheets-Sheet 2
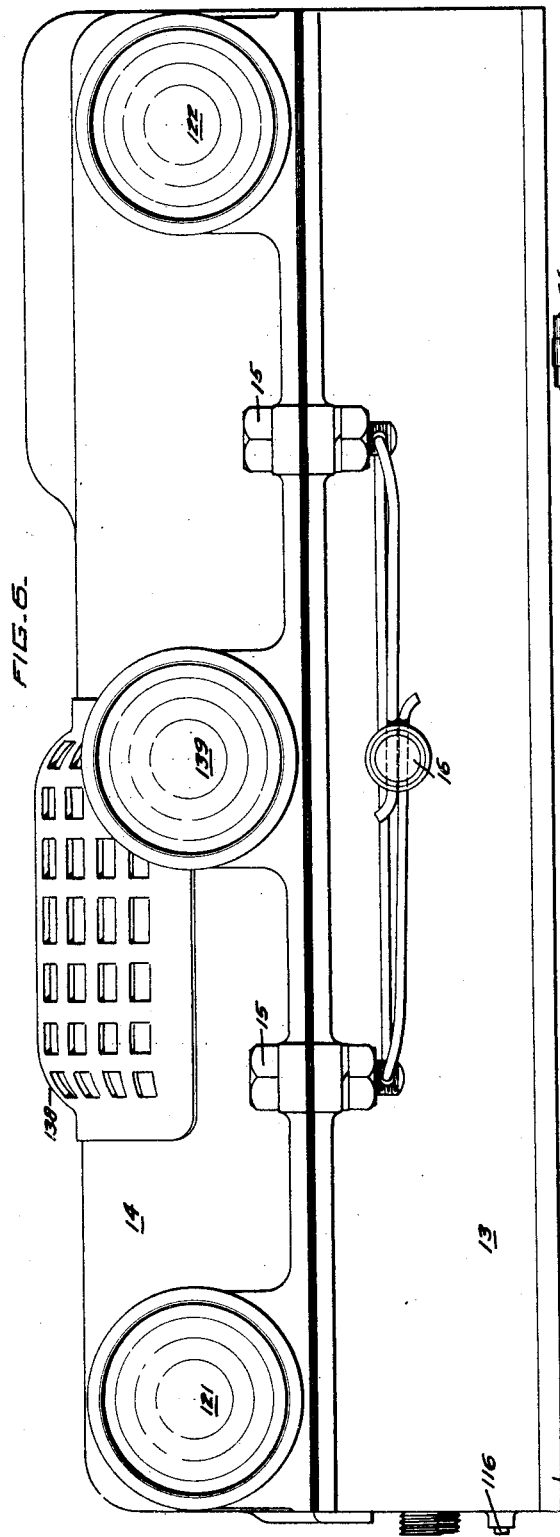
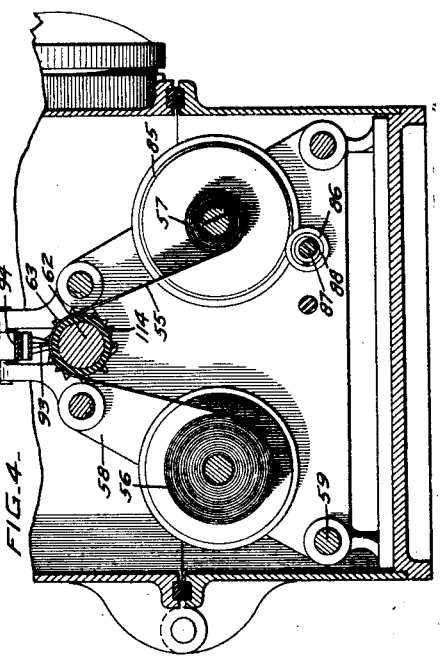
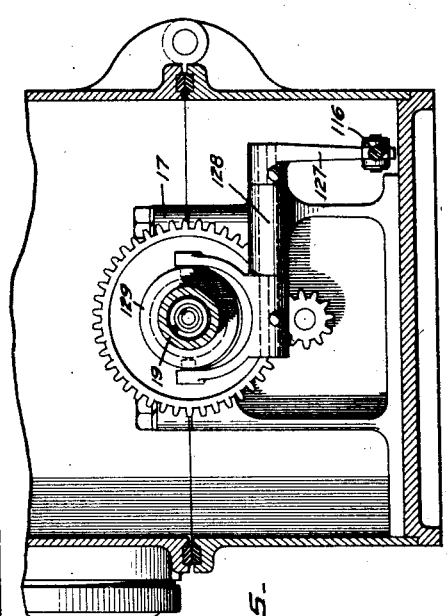
INVENTOR
ALBERT E. MOORHEAD
HIS ATTORNEYS Aug. 20, 1929.  A. E. MOORHEAD  1,725,204
SPEED INDICATING AND RECORDING APPARATUS
Filed May 14, 1923    4 Sheets-Sheet 3
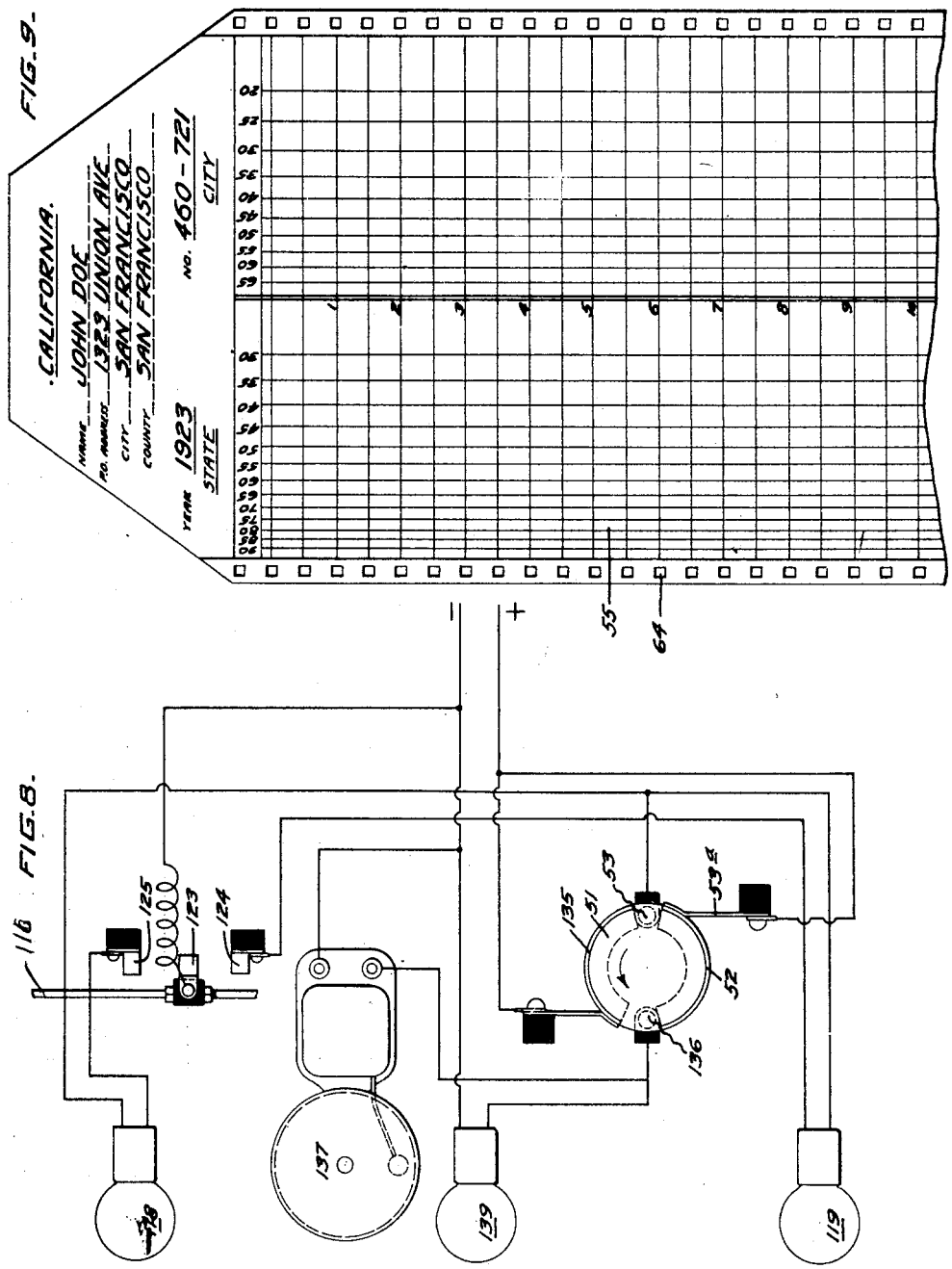
INVENTOR
ALBERT E. MOORHEAD
by White Prost Evans
HIS ATTORNEYS:

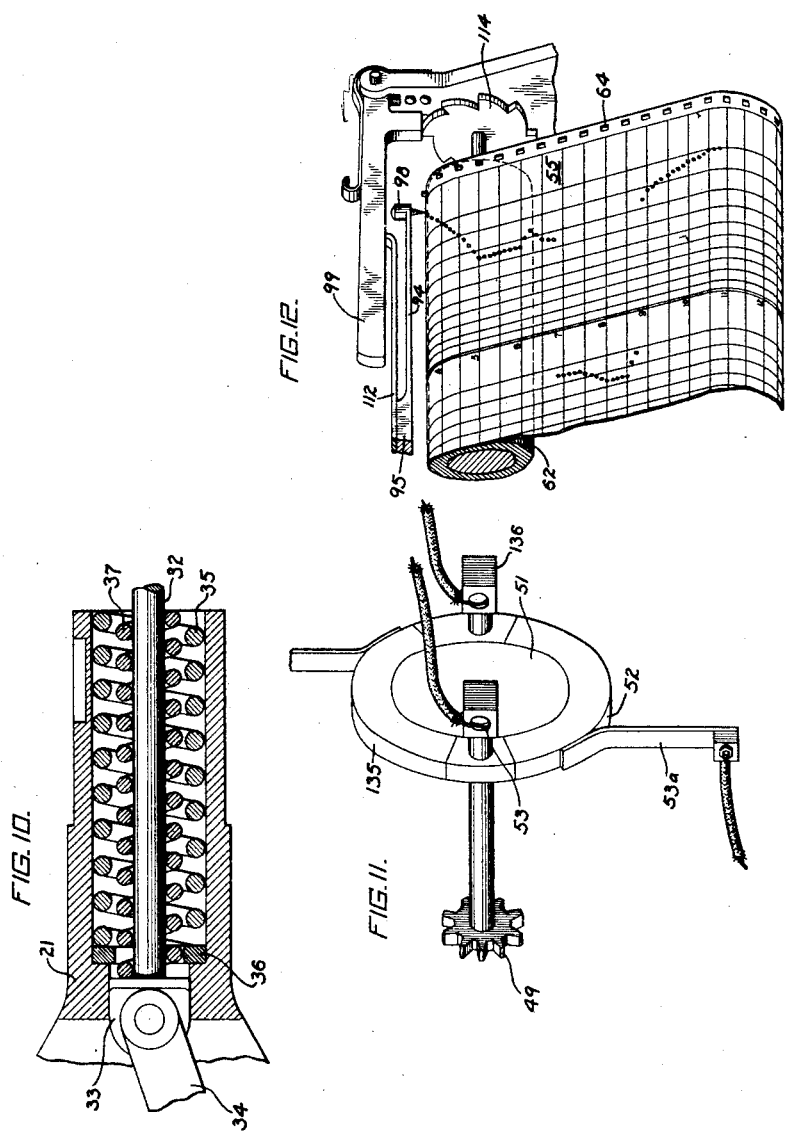

Patented Aug. 20, 1929.

1,725,204

UNITED STATES PATENT OFFICE.

ALBERT E. MOORHEAD, OF OAKLAND, CALIFORNIA.

SPEED INDICATING AND RECORDING APPARATUS.

Application filed May 14, 1923. Serial No. 638,808.

The invention relates to an apparatus adapted to be mounted on a motor vehicle, such as an automobile and to be connected to the running gear thereof to indicate and register the speed of the vehicle.

An object of the invention is to provide an apparatus adapted to be attached to an automobile for indicating when the speed of the automobile is in excess of the legal speed limit and for recording the speed of the automobile while it is traveling at such excess speed.

Another object of the invention is to provide a speed indicating and recording apparatus adapted to be mounted on an automobile and which is adjustable to indicate a speed in excess of different legal speed limits.

Another object of the invention is to provide an apparatus adapted to be attached to an automobile, which apparatus is provided with means for indicating the speed limit for which the apparatus is set.

A further object of the invention is to provide a speed recording apparatus adapted to be mounted on an automobile for recording the speed of the vehicle only during such times as such speed is in excess of the legal speed limit, the apparatus being adjustable so that the recording device is thrown into operation at different speed limits.

A further object of the invention is to provide a speed indicating apparatus adapted to be attached to an automobile for displaying a signal when the automobile is traveling at a speed in excess of the speed limit in the zone in which the automobile is traveling, the apparatus being adjustable to vary the speed at which the signal is brought into operation.

The invention possesses other advantageous features, some of which, with the foregoing, will be set forth at length in the following description where I shall outline in full that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:

Fig. 1 is a vertical longitudinal section through one form of apparatus embodying my invention.

Fig. 2 is a cross section taken on the line 2—2 Fig. 1.

Fig. 3 is a cross section taken on the line 3—3, Fig. 1.

Fig. 4 is a cross section taken on the line 4—4, Fig. 1.

Fig. 5 is a cross section taken on the line 5—5, Fig. 1.

Fig. 6 is a front elevation of the apparatus of my invention.

Fig. 7 is a rear elevation of a portion of the apparatus shown in Fig. 1.

Fig. 8 is a wiring diagram of the electrical circuits of the apparatus.

Fig. 9 is a view of a portion of the strip upon which the speed of the vehicle is recorded.

Figure 10 is a detail of the governor mechanism.

Figure 11 is a perspective view of the contact segments.

Figure 12 is a perspective view of the marking device including the cam wheel.

The number of accidents caused by the operation of automobiles at speeds in excess of the legal speed limit has reached such an appalling magnitude that something must be done to deter drivers from operating their automobiles at excessive speed. It has been proposed that governors be placed on automobile engines or on the running gear to limit the speed of the automobile, but this is not practical since there are occasions when it is necessary to operate the automobile at a speed in excess of the speed limit in order to avoid a serious accident. In my opinion, the most feasible way of deterring a driver from speeding is to impress on his mind that every time he speeds, a record of his violation of the law is made and that this record will be subsequently reviewed by the proper authorities having power to enforce the law and that he will be called to account for every infraction of the law. It is impossible to prevent the human being from giving vent to his desire to speed but if he knows that every time he does speed, a record thereof is being made, the probability of his speeding will be greatly reduced.

In accordance with my invention I have provided means for making a permanent record of the speed of the automobile. This record is made on a moving record strip and in order that the strip may not be used during the time that the vehicle is traveling within the speed limit I prefer to drive these strips only during such time that the speed is in excess of the speed limit thereby greatly reducing the length of the strip necessary in the apparatus. This strip bears the name and address and license number of the owner of the automobile and it must be presented at the end of the year with the application for the license number for the ensuing year. The motor vehicle authorities of the State will then have before them a complete record of all driving at excess speed which has been done by the operator during the year and may either levy a fine for each offense or if the offense has been flagrant they may both levy a fine and refuse to issue a license for the ensuing year. A new record strip is issued with the license plate, when issued, and the record strip is placed in the apparatus and the apparatus sealed by an authority delegated so to do. Should the driver be arrested for speeding at some locality, the authority at that locality may break the seal and open the housing, thus gaining access to the record so that definite proof may be had of the speed at which the vehicle was traveling. If the driver is fined or otherwise penalized at that time, a record thereof is made on a card which is kept with the record in the case and this card must be forwarded to the State authorities with the application for the new license number so that, if the driver has been already penalized for his speeding, the State authorities will not again penalize him.

The various State legislatures have enacted laws fixing different speed limits in different zones. In the State of California the speed limit within incorporated cities is 20 miles per hour and the limit out in the country is 35 miles per hour. The apparatus must be so designed to recognize and accommodate itself to the speed limits in these different zones, since otherwise it would not appear on the record whether a speed of 35 miles per hour was made within a city or out in the country. I have therefore provided means for setting or adjusting the apparatus of my invention so that it may operate at a speed of 20 miles an hour or more or at a speed of 35 miles an hour or more or, at any other speed, which is the limit fixed by the authorities I also provide a signal for indicating the setting of the apparatus, that is whether or not it is set to operate at a speed limit of 20 miles per hour or a speed limit of 35 miles per hour, so that when an automobile is operating within a city the driver cannot set the mechanism at the 35 mile per hour adjustment and thus travel within the city up to a speed of 35 miles per hour without making a record. The apparatus may be further adjusted to bring it into operation at speeds lower than 20 or 35 miles per hour and in the case of a driver whose violation of the law is flagrant, the apparatus may be set to indicate violations at a speed of 15 miles per hour and 30 miles per hour respectively, thus forcing the driver to keep within these limits in the respective zones. I also provide a signal, preferably the combination of a visible and an audible signal for indicating when the vehicle is traveling at a speed in excess of the limit in the particular zone in which the vehicle is traveling. By this means, not only will the authorities be apprized of the violation of the law by the driver, but drivers of other automobiles will be apprized of the presence on the road of a speeder and thus take precaution to prevent accidents. As I have stated before, the recording mechanism of the apparatus is preferably not brought into operation until the vehicle exceeds the speed limit in the zone in which it is traveling, for the purpose of minimizing the length of the record strip which is necessary for one year's travel, but if this consideration is not important, the record strip may be driven continuously during the movement of the vehicle. The apparatus is connected by a flexible shaft or otherwise with the running gear of the vehicle so that it is driven at a speed corresponding directly with the speed of the vehicle and when traveling at a speed in excess of the legal limit, the record strip is driven at a speed in accordance with the speed of the vehicle so that the record denotes both the speed and the duration of the time of excess speed of the vehicle.

The apparatus of my invention comprises a suitable base plate 12 upon which the bearings and supports for the various elements of the apparatus are mounted. The apparatus is enclosed in a casing or housing 13 having a removable cover 14 which is secured in place in any desired manner such as by the bolts 15, the ends of which are connected by a seal 16, to furnish evidence of any improper opening of the case. Journaled within the casing of the bearings 17 is a rotatable member 18 having hollow spindles 19 and 21. Secured to the hollow spindle 19 is a gear 22 which meshes with a gear 23 which is secured to the end of a shaft 24 which extends from the end of the casing. The shaft 24 is suitably connected, as by a flexible drive shaft, with the running gear of the automobile, for instance the front wheel or the drive shaft of the automobile so that the rotatable member 18 is rotated at a speed corresponding to the speed of the automobile. Pivoted to the rotating element 18 at its axis of rotation is an element in the nature of a fly-ball governor 25 the position of which is varied in accordance with varying speeds of rotation of the member 18. The axis of the fly-ball governor element 25 normally lies at an acute angle to the axis of rotation of the member 18 but as the speed of the member 18 increases, centrifugal force causes the member 25 to move to a position of greater angularity with respect to the axis of the member 18. The extent of movement of the member 25 varies with the speed of the member 18 so that such extent of movement becomes a measure of the speed of the member 18. Means are provided for presenting a resistance to the movement of the member 25 and for transmitting its movement to the recording apparatus. Attached to the member 25 and concentric with its pivot is a gear 26 which meshes with the arcuate racks 27 formed on the levers 28 which are pivotly mounted on the member 18. Movement of the member 25 with respect to the axis of the member 18 thus causes movement of the levers 28. Connected to the ends of the levers 28 by the links 34, are heads 33 which move into the hollow spindles 19 and 21, the head associated with the spindle 21 being secured to a rod 32 disposed in the spindle. Disposed in each hollow spindle is a heavy coiled spring 35 which bears at one end against a collar 36 which is normally spaced a slight distance from the head 33 so that the head must be moved a slight distance before it encounters the resistance of the spring 35. Disposed within the spring 35 and bearing against the head 33 is a weaker coiled spring 37 which exerts a continuous resistance to the movement of the member 25. The springs 35 and 37 in the hollow spindle 19 contact at their other ends with an adjustable abutment 38, the position of which is adjusted by the set screw 41, to vary the resistance of the spring to the movement of the member 25. Due to the arrangement of the two springs 35 and 37 it is evident that the member 25 has a more or less free movement during the initial part of its movement to bring the head 33 into contact with the collar 36, after which the resistance to its movement is greatly increased. This comparatively free range of movement of the member 25 is so proportioned that the head 33 will come in contact with the collar 36 at a very slow speed of the vehicle thus causing the rod 32 to be moved a slight distance almost instantaneously, after the vehicle starts movement. This initial movement is employed, in the present construction, to close an electric circuit through a visible signal which indicates the setting of the apparatus with regard to the speed limit or zone in which the vehicle is operating.

The stem 32, longitudinal movement of which is produced by movement of the member 25 with respect to the axis of the member 18, is connected to a shaft 42 so that longitudinal movement of the rod 32 is transferred to the shaft 42. The shaft 42 is provided with a rack 43 formed of peripheral parallel teeth and this rack is engaged by the toothed segment 44 of the lever 45 which is secured to the shaft 46. The shaft 46 is suitably journaled in the bracket 47 and secured to the rear end of the shaft 46 is a segmental gear 48 which meshes with a gear 49 secured to the shaft of the contact disc 51, which is preferably formed of electrical insulation material, and secured thereto is a metallic segment 52 which is engaged by the brush 53$^a$ which comprises one end of an electric circuit through a visible signal, such as an electric light. Disposed adjacent the disc and in approximate contact with the segment 52 is a contact 53 on the other side of the electrical circuit and when the disc rotates sufficiently to bring the segment 52 into contact with the contact 53, the electrical circuit through the signal is closed. The spacing between the segment 52 and the contact 53 is such that the circuit is closed as soon as movement of the vehicle starts and the segment 52 is of such length that the circuit remains closed as long as the vehicle is moving and regardless of the speed of the vehicle. The contact 53 is connected, through a switch, with either of two circuits in which the electric lamps are disposed so that when the segment 52 engages the contact 53 one of these circuits is energized and one of the lamps is illuminated. These lamps produce signals of different color and thus indicate the speed limit setting of the apparatus, that is, they indicate whether the apparatus is set to record speeds in excess of 20 miles an hour or speeds in excess of 35 miles per hour. The mechanism employed for setting the apparatus for these two different limits will be set forth hereinafter.

Arranged within the casing is a record sheet 55 upon which the record of the speed of the vehicle is made. This sheet is suitably mounted on reels and means are provided for moving the sheet in accordance with the speed of the vehicle. Instead of driving the sheet continuously during the movement of the vehicle I prefer to drive the sheet only during such time as the vehicle is traveling at a speed in excess of the speed limit for which the apparatus is set. The feed reel 56 and the take-up reel 57 are mounted in a carriage 58 which is movable longitudinally on the four rods 59 which are secured to brackets mounted on the base plate 2. The record strip passes from the feed reel 56, which is provided with a brake 61 to retard rotation of the reel and hold the strip taut, over the feed roller 62 and down to the take-up reel 57. The feed roll is preferably provided with a plurality of projecting pins 63 which engage in apertures 64 in the record strip 55, to secure positive movement of the record strip.

Means are provided for rotating the feed roller 62 only during such time that the vehicle is traveling at a speed in excess of the speed limit of the setting of the apparatus. Splined to the rod 32 and movable longitudinally with respect to the hollow spindle 21 is a clutch plate 65 against which the end of the springs 35 and 37 bear. As these springs are compressed due to the movement of the member 25 with respect to the axis of the member 18, the clutch plate 65 is moved longitudinally into frictional engagement with its associated clutch plate 66. The clutch plate 66 is not attached to the shaft 42 and is journaled in the bearing 67 arranged in the bracket 68. The clutch plate 66 is therefore not rotated until it is engaged by the clutch plate 65. Secured to the clutch plate 66 and concentric therewith is a gear 69 which meshes with a gear 71 secured to the shaft 72. Secured to the other end of the shaft 72 is a gear 73 which meshes with a gear 74 which is secured to a sleeve 75 surrounding the shaft 42 and extending through the bracket 76. Secured to the sleeve 75 is a gear 78 meshing with a gear 79 journaled in the brackets 76. Secured to and preferably formed integrally with the gear 79 is a concentric gear 81 having long teeth. The teeth of this gear are made long so that the gear will remain enmeshed with the gear 82 on the end of the shaft of the feed roll 62, as the carriage carrying the feed roll is moved longitudinally on the rods 59. The feed roll is thus driven from the clutch plate 66, regardless of the position of the carriage 58 and the chain of gearing between the clutch plate 66 and the feed roll 62 is such that the feed roll is moved slowly as for example, ½ inch for each mile that the vehicle travels at a speed in excess of the speed limit for which the apparatus is set. The take-up reel 57 is driven frictionally and the friction driving element rotates at such speed that the record strip is always kept taut. The take-up reel is preferably provided at its ends with conical friction plates 85 which are engaged by the friction drive cones 86 splined to the shaft 87 and pressed into friction or engagement with the cones 85 by the spring 88. The shaft 87 is mounted in the carriage 58 and is provided on its end with a gear 89 which meshes with the long gear 91 secured to the shaft 72. The speed of the shaft 87 is such that the drive cones 86 have a tendency to drive the take-up reel at a speed in excess of the speed of the feed roll 62, at all times, so that regardless of the diameter of the roll of the strip on the take-up reel, the strip will always be taken up as fast as it is advanced by the feed roll.

Any suitable means may be employed for making a record of the speed of the vehicle on the record sheet as the sheet is moved by the feed roll. In the present construction I have employed a perforating pin 93 which will mark a perforated line in the record and thus indicate the speed of the vehicle and the duration of such speed. The pin 93 is disposed directly above the feed roll 62, which is preferably made of rubber or some similar conformable material, and is mounted on a spring arm 94 carried by the slide 95 which is provided with a rack 96 engaging the arcuate segment 97 on the lever 45, so that as the lever 45 is moved due to the longitudinal displacement of the shaft 42, the slide 96 is moved to vary the position of the pin 93 on the record. Means are provided for vibrating the arm 94 to cause the pin 93 to perforate the record sheet when the speed of the vehicle exceeds the speed limit. Pivoted to the carriage 58 and disposed above the head 98 of the spring arm 94 is a hammer 99 which is normally held out of contact with the head 98 by the spring 112. The hammer is provided with a foot 113 which bears against a cam wheel 114 secured to the shaft of the feed roll so that as the feed roll rotates the hammer is raised and repeatedly dropped against the head 98, driving the pin 93 through the record strip.

The carriage 58 is movable into two or more positions, to position different zones or strips of the record strip under the pin 93. In the drawing I have divided the record strip into two zones, on one of which there is to be indicated the speed in excess of 20 miles an hour and on the other of which there is to be indicated a speed in excess of 35 miles an hour and the carriage is movable to bring the pin 93 into association with either of these zones, depending upon the speed limits existing in the zone in which the automobile is traveling. In Figure 1, the carriage is in the position to cause a record to be made of speeds in excess of 35 miles per hour. To record speeds in excess of 20 miles per hour the carriage is shifted to the right, bringing the other zone of the record strip under the pin 93. Means are provided for shifting the carriage to either of its operating positions and for simultaneously closing the circuit through the corresponding signal to indicate the setting of the apparatus and to simultaneously vary the spring resistance to the movement of the member 25 with respect to the axis of the member 18 so that the feed roll will not be driven until the vehicle reaches the speed limit for the selected zone. Disposed in the casing and extending therefrom at one end is a rod 116 which is secured to the bracket 117 extending from the carriage 58, so that by shifting the rod 116 the carriage may be moved to either of its positions. The means provided for indicating the speed setting of the apparatus are preferably two electric lamps 118—119 disposed behind lenses 121—122, of different color, arranged on the front of the casing. The casing is preferably arranged in front of the radiator of the automobile so that these lamps are visible to anyone as the vehicle travels along the street or road. Disposed in the circuits of these lamps is a double throw switch having a movable contact 123 secured to the rod 116, the contact being movable into engagement with either of the two fixed contacts 124 and 125, in the circuits of the lamps 118 and 119 respectively. When the rod 116 is in its left hand position the circuit through the lamp 118 is closed while the vehicle is moving thus indicating to all observers that the apparatus is set for the 20 mile speed limit and when the rod 116 is moved to its right hand position the lamp 119 is illuminated when the vehicle is moving thus indicating that the apparatus is set for the 35 mile speed limit. The police authorities are therefore enabled at a glance to determine whether or not the driver has properly set the apparatus in accordance with the speed limit of the zone in which the vehicle is traveling. The respective circuits through the lamps 118 and 119 however are not closed while the vehicle is standing still so that there is no useless consumption of electric current. As soon as the vehicle starts rolling the governor weights assume an angle more nearly perpendicular to the axis of the shaft 21. This movement of the governor forces the links 34 apart longitudinally of the shaft 21 whereupon the shaft 32 being connected to the link 34 is also moved longitudinally of the shaft. This motion of shaft 32 is communicated to lever 44 by means of the rack 43 and the shaft 42. Since the contact disk 51 is connected to lever 44 by means of the interposed shaft 46, the gear 49, and segmental gear 48, the motion of lever 44 causes a corresponding rotation of the contact disk 51. When the contact disk 51 rotates the segment 52 comes into engagement with the contact 53, closing the circuit through the selected lamp. Pivoted to the rod 116 is a lever 127 fulcrumed to the bracket 128 and provided at its free end with a fork provided with pins which engage in the groove of the collar 129 which is mounted on the hollow spindle 19. The collar is provided with pins 131 which extend through longitudinal slots 132 in the hollow spindle 19 and into the block 133 in which the adjusting screw 41 is seated. Movement of the rod 116 is therefore accompanied by movement of the backing plate 39 for the springs 35 and 37, thus varying the compression of these springs and for a given speed the movement of the member 25 with respect to the axis of the member 18 depends on the resistance offered by the compression of the springs 35 and 37. The varied resistance of the springs 35 and 37 (as controlled by the rod 116, intermediate mechanism, and backing plate 39) will therefore result in varied relative motion between the member 25 and the axis of the member 18 for a given speed. And since the relative motion between the member 25 and the axis of the member 18 controls the engagement of the clutch members 65 and 66 then for a given speed, one position of the rod 116 will allow more relative motion between member 25 and the axis of member 18 than will another position of rod 116. The positions of the rod 116 and interrelated clutch actions correspond to the speed limits for which the apparatus is set. Means are provided for operating a signal or warning when the vehicle is being driven at a speed in excess of the limit speed for which the apparatus is set. Arranged on the disc 51 is a second contact segment 135 which cooperates with a contact 136 arranged in the circuit of the signaling devices. In the present instance these signaling devices comprise means for producing an audible signal and a visible signal. The audible signal is produced by an electrically operated bell 137 arranged behind a perforated shield 138 on the casing. The visible signal comprises an electric lamp 139 which is disposed behind a colored lens, which is preferably amber, which is arranged on the front of the casing so that it is readily visible. As the lever 45 is moved, due to variations in speed of the vehicle, the contact segment 135 is moved with respect to the contact 136. The distance between the contact segment and the contact is such that the electric circuit between these two elements is closed when the vehicle reaches a speed of 20 miles an hour, if the apparatus is set at the 20 mile limit speed, and is closed when the automobile reaches a speed of 35 miles an hour when the apparatus is set at the 35 mile limit speed. The variation in compression of the springs 35 and 37, due to the longitudinal shifting of the backing plate 39 by the rod 116, controls the movement of the member 25 in such manner that the circuit between the contact 135 and 136 is closed when the vehicle reaches the limit speed, for which the apparatus is set.

Disposed within the casing is a card 142 bearing the name and address and vehicle license number of the owner of the vehicle and in the event that the owner is arrested for driving at an excess speed, the proper authority may break the seal 16, open the casing and endorse on the card the nature of the infraction and the fine imposed therefor, so that at the end of the year when the owner turns in the record strip 55 to the State authorities, he will not be again fined for the same offense. The record strip is preferably divided into two zones by a longitudinal line, one zone representing State driving and the other zone representing city driving and as the record strip carriage is moved, the recording device is positioned over one or the other of these zones, in accordance with the setting of the apparatus. The apparatus will not operate to prevent speeding, since very often it is essential to the driver to exceed the speed limit for a short distance in order to avoid an accident, but the arrangement of the apparatus on the vehicle will deter the driver from speeding since he is aware that a permanent record is being made of every infraction and that such record will be subsequently examined by the authorities. The driver will be advised when the vehicle is moving at a speed in excess of the limit by the ringing of the bell and he can immediately reduce his speed to below such limit.

In the drawings I have shown an apparatus in which the various parts are mechanically operated, but it is to be understood that electricity may be substituted as the motive power in many places by well-known electrical means. For instance two spaced solenoids may surround a core on the rod 116 so that by closing the circuit through the proper solenoid, the rod will be moved to change the setting of the apparatus, also the clutch may be of the electric or electromagnetic type or may be electrically operated to engage the clutch plates when the segment 135 engages the contact 136.

It is also to be understood that each apparatus will be tested and checked against a standard accurate speedometer, at various speeds and in its various adjustments, before being placed on the automobile and may be again checked at intervals to insure its accuracy.

I claim:

1. A device for recording the speed of a vehicle comprising a member adapted to be driven by the running gear of the vehicle and arranged to vary its position due to varying speeds, a speed recording means and a clutch interposed between said member and said recording means adapted to connect the recording means to the member when the vehicle reaches a predetermined speed and means for varying said predetermined speed during the operation of the device.

2. A device for recording the speed of a vehicle comprising a member adapted to be driven by the running gear of the vehicle and arranged to vary its position due to varying speeds, a spring resisting the position varying movement of said member, means for varying the resistance of said spring during the operation of the device, a speed recording means, a clutch interposed between the recording means and said member, the position varying movement of said member serving to engage said clutch when the vehicle reaches a predetermined speed.

3. A device for recording the speed of a vehicle comprising a shaft adapted to be driven by the running gear of the vehicle, a ball governor mounted on said shaft, a speed recorder, a shaft driving said recorder, a clutch plate on said latter shaft, a clutch plate on said former shaft and means operated by the ball governor for bringing said plates into engagement.

4. A device for recording the speed of a vehicle comprising a record sheet, means for marking a record on said sheet, means operated by the varying speed of the vehicle for moving said recording means with respect to said sheet, means for moving the sheet with respect to the recording means and means for shifting the sheet to bring the recording means into position over a different portion of the sheet.

5. A device for recording the speed of a vehicle, comprising a carriage, a record sheet arranged on said carriage, means for moving the sheet on the carriage, means for marking a record on the moving sheet, means operated by the varying speed of the vehicle for moving the recording means with respect to the sheet and means for moving said carriage to vary the position of the moving sheet with respect to the recording means.

6. A device for recording the speed of a vehicle comprising a carriage, a record sheet arranged on said carriage, means for moving the sheet, means for marking a record of the speed of the vehicle on the moving sheet operable at a predetermined speed, means operated by the varying speed of the vehicle for moving the recording means with respect to the sheet at right angles to the direction of movement of the sheet, means for moving the carriage to bring a different portion of the sheet into co-operative relation with the recording means operated by said carriage moving means for varying the predetermined speed at which the recording means becomes operative.

7. A device for recording on a sheet the speed of a vehicle comprising recording means for marking said sheet and means for setting the recording means to make separate records when the vehicle is traveling in zones of different speed limits.

8. A device for recording the speed of a vehicle on a sheet having a separate portion allotted to each speed zone comprising recording mechanism for marking said sheet, and means for adjusting the recording mechanism to bring it into register with the portion allotted to the selected speed zone.

9. A device for recording the speed of a vehicle in different speed zones on a record sheet having areas representing each different speed zone comprising means for recording the vehicle speed in the area corresponding to the zone in which the vehicle is moving.

In testimony whereof, I have hereunto set my hand.

ALBERT E. MOORHEAD.